United States Patent
Dola

(10) Patent No.: US 9,372,904 B2
(45) Date of Patent: Jun. 21, 2016

(54) DATA COMPASS

(71) Applicant: Cellco Partnership, Arlington, VA (US)

(72) Inventor: Srinivasa Rao Venkata Dola, Cumming, GA (US)

(73) Assignee: Cellco Partnership, Basking Ridge, NJ (US)

( * ) Notice: Subject to any disclaimer, the term of this patent is extended or adjusted under 35 U.S.C. 154(b) by 126 days.

(21) Appl. No.: 14/251,067

(22) Filed: Apr. 11, 2014

(65) Prior Publication Data

US 2015/0293980 A1  Oct. 15, 2015

(51) Int. Cl.
*H04L 29/06* (2006.01)
*G06F 17/30* (2006.01)
*G06F 21/60* (2013.01)
*G06F 21/62* (2013.01)
*G06F 9/46* (2006.01)

(52) U.S. Cl.
CPC ............ *G06F 17/30563* (2013.01); *G06F 9/46* (2013.01); *G06F 17/30097* (2013.01); *G06F 21/60* (2013.01); *G06F 21/6254* (2013.01)

(58) Field of Classification Search
CPC ................................................ G06F 17/30563
See application file for complete search history.

(56) References Cited

U.S. PATENT DOCUMENTS

| | | | | |
|---|---|---|---|---|
| 5,224,166 A | * | 6/1993 | Hartman, Jr. ....... | G06F 12/0802 380/277 |
| 7,100,195 B1 | * | 8/2006 | Underwood .......... | G06F 9/4443 707/999.009 |
| 7,403,901 B1 | * | 7/2008 | Carley .............. | G06F 17/30306 379/111 |
| 7,437,614 B2 | * | 10/2008 | Haswell ............. | G06F 11/3684 714/38.13 |
| 7,630,986 B1 | * | 12/2009 | Herz ................ | G06Q 10/10 |
| 9,003,558 B1 | * | 4/2015 | Dorwin .............. | G06F 21/602 726/30 |
| 2005/0021539 A1 | * | 1/2005 | Short .............. | H04L 9/001 |
| 2008/0034222 A1 | * | 2/2008 | Torisaki ............ | G06F 21/10 713/193 |
| 2009/0254572 A1 | * | 10/2009 | Redlich ............. | G06Q 10/06 |
| 2011/0105145 A1 | * | 5/2011 | Chandrasekaran ... | H04L 63/107 455/456.1 |
| 2011/0109792 A1 | * | 5/2011 | Montag ............. | H04L 65/602 348/390.1 |
| 2015/0006885 A1 | * | 1/2015 | Arya ................ | H04L 63/0428 713/156 |
| 2015/0066861 A1 | * | 3/2015 | Ritto ............... | G06F 17/30289 707/661 |

OTHER PUBLICATIONS

Soliman, Mostafa I., and Ghada Y. Abozaid. "FastCrypto: parallel AES pipelines extension for general-purpose processors." Neural, Parallel & Scientific Computations 18.1 (2010): 47-58.*

* cited by examiner

*Primary Examiner* — Shawnchoy Rahman
(74) *Attorney, Agent, or Firm* — Fishman Stewart PLLC

(57) ABSTRACT

A system contains at least one load server that receives subscriber files including encrypted and unencrypted data from a vendor server connected to a subscriber network. The load server includes a load server processor that sorts the encrypted files to a decryption route and the unencrypted files to a direct loading route. The decryption route includes a decryption module that decrypts the encrypted files. The data warehouse includes at least one data warehouse processor having a job tasking module that assigns dedicated load jobs to each file. The data warehouse processor includes a staging module that loads data to a staging table. The data warehouse processor loads data from the staging table to a target table and aggregates the data into a report.

19 Claims, 7 Drawing Sheets

DATA COMPASS

BACKGROUND

A substantial portion of the costs of business intelligence relative to a target audience, for example cellular subscribers, relates to data management including the design and development of an architecture for a data warehouse. The data warehouse may transform subscriber data into a target format that may be used for business analytics. Considering the increased data usage of cellular devices and enhanced privacy standards for cellular data, there is a need for a secure, streamlined, and scalable data compass that may direct the management of subscriber data while identifying corrupted data, providing alerts to minimize data loss, and optimizing the extraction, loading, and transformation of subscriber data into reports for business intelligence.

DETAILED DESCRIPTION

Figure 1:
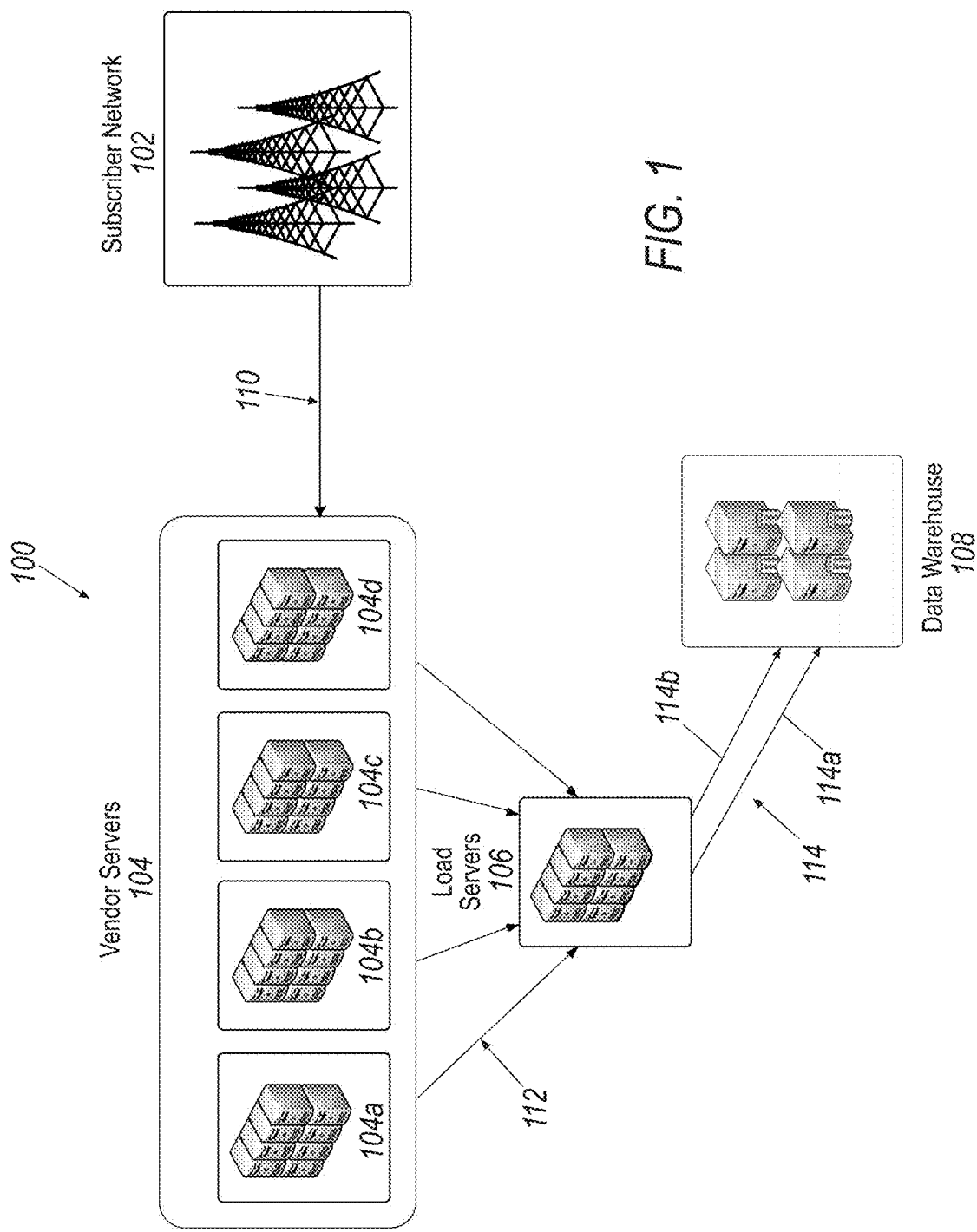
FIG. 1 illustrates an exemplary system for processing subscriber data.

A data management system may include a secure, streamlined, and scalable data compass to process subscriber data and generate analytics reports. The system may be configured to route and analyze data, for example, based on the encryption status. Furthermore, the system may be configured to maintain the security of sensitive data, for example, by anonymizing subscriber identity data. Moreover, the system may identify and send alerts regarding data anomalies, for example, to reduce propagation and promote correction of bad data. In addition, the system may generate analytics reports, for example, to facilitate business intelligence regarding subscriber data. Thus, the data compass may direct the processing of reports while promoting the security and integrity of subscriber data.

The system may process subscriber data into a target format that may be desirable for analytics. For example, the reports may reflect consumer activity of the target audience such as work and home locations, traffic patterns, and demographics for particular locations. Also, the reports may identify mobile content that may be desirable to the target audience. By focusing on the target format, insightful business intelligence may be generated.

Furthermore, the reports may include information associated with a target audience such as demographic, geographic, and psychographic attributes. Demographic attributes may include information related to personal identity such as age, gender, cultural group, and any other descriptive traits. Geographic attributes may include information related to an approximate physical location of a person or object at a point in time, for example a zip code, area code, and any other locational information. Psychographic attributes may include information related to personal behavior, habits, and preferences, for example, with respect to shopping, coffee, gardening, or any other personal interest. Demographic, geographic, and psychographic attributes may be beneficial in understanding the target audience.

To process the subscriber data into the target format, the system may extract, load, and transform subscriber data. The subscriber data may be collected from a plurality of mobile devices on a subscriber network that may be maintained by a network provider. The subscriber network may provide the data to vendor servers. The vendor server may add secure attributes and send the subscriber data to load servers for loading into a data warehouse. The vendor servers may include servers that are maintained by a third-party vendor at a vendor site and may be independent of a network provider. The load servers may be maintained by the network provider at a network provider site, which may not be accessible to the third-party vendor.

The subscriber data received by the load servers may include encrypted data with subscriber information and unencrypted data with aggregated information. To facilitate efficient processing of data, the subscriber data may be directed according to encryption status with unencrypted data being routed to a direct loading route while the encrypted data is routed in parallel to a decryption route. For each file on each route to each load server, each load server may assign designated load jobs to each file for parallel processing of files on the data warehouse.

To promote data security, the originally encrypted data, after passing through the decryption route, may be hashed on a staging database of the data warehouse to remove sensitive subscriber identity data prior to being loaded to a production database of the data warehouse. The production database may be located and maintained by the network provider at one or more provider site, which may share information among one or more provider sites and control which users are allowed to modify or update the information. With respect to the production database, each load job may run a particular file through various checks and alerts to promote accurate processing of data and timely correction of abnormalities. The resulting data may be loaded into tables and aggregated into the target format for reporting.

FIG. 1 illustrates an exemplary system 100 for extracting, loading, and transforming subscriber data. System 100 may include a subscriber network 102, vendor servers 104, load servers 106, and a data warehouse 108. System 100 may include subscriber network 102 operatively connected to vendor servers 104, vendor servers 104 operatively connected to load servers 106, and load servers 106 operatively connected to data warehouse 108. In operation, subscriber data 110 may flow from subscriber network 102 to vendor servers 104 for the addition of secure attributes resulting in subscriber data 112, subscriber data 112 may flow from vendor servers 104 to load servers 106 for decryption and loading of encrypted files resulting in subscriber data 114a and loading of unencrypted files resulting in subscriber data 114b, and subscriber data 114a and 114b may flow to data warehouse 108 for loading, hashing, checking, aggregation, alerts, and reports. System 100 may take many different forms and include multiple and/or alternate components and facilities. While exemplary system 100 is shown in FIG. 1, the exemplary components illustrated in FIG. 1 are not intended to be limiting. Indeed, additional or alternative components or implementations may be used.

Subscriber network 102 may be configured to provide communications services to a plurality of subscriber devices and to generate subscriber data including location attributes and web and application usage data including subscriber attributes based on the provided services. The subscriber network 102 may provide communications services, such as packet-switched network services (e.g., Internet access, VoIP (Voice over Internet Protocol) communication services) and location services (e.g., device positioning), to devices connected to the subscriber network 102. Exemplary subscriber networks 114 may include a VoIP network, a VoLTE (Voice over LTE) network, a cellular telephone network, a fiber optic network, and a cable television network, as some non-limiting examples. Subscriber devices on the subscriber network 102 may be associated with subscriber information including subscriber identifiers used to uniquely identify the corresponding devices. Subscriber identifiers may include various types of information sufficient to identify the identity of a subscriber or a subscriber device over the subscriber network 102, such as mobile device numbers (MDNs), mobile identification numbers (MINs), mobile telephone numbers (MTN), common language location identifier (CLLI) codes, Internet protocol (IP) addresses, and universal resource identifiers (URIs), as some non-limiting examples. Subscriber data may include a data string having a file record. The file record may include a file history and, depending of the file type, a subscriber key having subscriber identifiers.

Subscriber data may contain encrypted files and unencrypted files. The encrypted files may be encrypted to secure sensitive subscriber information, for example, including subscriber identifiers. The unencrypted files may include summarized or aggregated information without subscriber identifiers or other potentially sensitive subscriber-specific data, for example data reflecting a number of subscribers at a particular location without the subscriber identity data of the particular subscribers at the location. Subscriber data may have a filename on each file and may include a record count, e.g., for record count checks, as well as a time including a date, hour, and minute, e.g., for tracking The filename may include a naming convention to specify that a particular file is encrypted or unencrypted, which may facilitate routing of data as discussed below.

Subscriber data may be encrypted and unencrypted as the subscriber data passes through system 100 using subscriber keys. Each subscriber key may be included in a text field in the file record of individual files. The subscriber key may be assigned a subscriber identity on data warehouse 108. Using the subscriber key, encrypted files may be decrypted to determine the subscriber identity of the individual subscriber. As the data passes through system 100, the customer keys may be decrypted and unencrypted with an algorithm using secure key classes. An exemplary algorithm may include an RSA algorithm that may use a product of prime numbers along with an auxiliary value as a public RSA key to encrypt data (e.g. at subscriber network 102 or vendor servers 104) and knowledge of the prime numbers as a private RSA key to decrypt the data (i.e. at load server 106). The private RSA keys may be periodically changed (e.g. every 30 days) to change the working public RSA keys as data passes through system 100. As the files reach data warehouse 108, the files may be loaded into volatile memory of data warehouse 108. The subscriber identifiers may be anonymized by hashing the keys and purged before entering data warehouse 108. Thus, while subscriber data may be bi-directionally decrypted and unencrypted with the respective keys prior to data warehouse 108, the hashing on data warehouse 108 may uni-directionally purge subscriber keys, including the subscriber identifiers, for increased security of subscriber information on data warehouse 108. For purposes of this disclosure, subscriber data is referred to as subscriber data 110, 112, 114, 114a, and 114b to provide an exemplary reference with respect to system 100 without limiting the content of the subscriber data at the exemplary reference.

Vendor servers 104 may receive subscriber data 110 from subscriber network 102. Exemplary vendor servers 104 may include a location data vendor. Vendor servers 104 may have a multiple clouds of servers at various vendor sites or distribution centers. Vendor servers 104 may split subscriber data 110 into intervals, compress subscriber data 110, and add secure attributes resulting in subscriber data 112. Exemplary secure attributes from vendor server 104 may include time, location, and internet usage details of an individual subscriber, for example where the subscriber is coming from and may be going, in what direction and at what speed is the subscriber traveling, which URLs were browsed by the subscriber and for how long, etc.

The data interval may determine the frequency at which data may be sent from vendor servers 104 to load servers 106. The interval may be set based on the volume of data that needs to be processed. For example, decreasing the interval from approximately a one (1) hour interval to approximately one (1), five (5), or ten (10) minute interval may break the data into smaller increments and may allow for a larger overall volume of data to be processed. As the overall data volume increases, it may be desirable to further shorten the interval.

Load servers 106 may receive subscriber data 112 on a landing zone for each load servers 106 in a round-robin fashion, which may occur continuously or at any time for any file type. Load servers 106 may route encrypted data to a decryption module and unencrypted data to a direct loading module. For encrypted files, the decryption module may perform operations such as decompression, decryption, records checking, records sorting, and load processing of resulting subscriber data 114a to data warehouse 108. For unencrypted files, the direct loading module may perform operations such as decompression, file sorting, and load processing of resulting subscriber data 114b to data warehouse 108. Parallel process may run between load servers 106 and data warehouse 108 with multiple parallel processes (e.g., each process dedicated to a particular file) and each process spawning multiple threads (e.g., each thread dedicated to a portion of the particular file). When subscriber data 114 including subscriber data 114a (e.g., encrypted) and subscriber data 114b (e.g., unencrypted) for all file types lands in the landing zone of each load servers 106, a file watcher may be running continuously or periodically to look for files and may route files based on the filename to either undergo decryption (e.g., for encrypted data) or direct loading (e.g., unencrypted files). Parallel processes may run between load servers 106 and data warehouse 108. An exemplary load server 106 may include a UNIX server, as this server type may provide enhanced up-time, load handling, availability, security, and reliability.

Data warehouse processing between load servers 106 and data warehouse 108 may include an extract, transform, and load (ETL) process or an extract, load, and transform (ELT) process. Generally, an ETL process may include routines to transform source data (e.g., subscriber data) to a target data set (e.g., data targeted for a report) prior to loading into a data warehouse and, in contrast, an ELT process may include routines to transform source data to a target data set on the data warehouse 108. For an ETL process, subscriber data may be transformed into a target format at a staging database 116 separate from and prior to a production database 130 of data warehouse 108. In contrast, for an ELT process, subscriber data may be transformed into a target format on production database 130 of data warehouse 108. Exemplary routines for either process may include assignment of load jobs for each file, record checking, record filtering and sorting, hashing, compression, backup, loading fields to staging and error tables, records sums, record compares, threshold checks, loading fields to target and load status tables, verification checks, load status updates, alert generation, archiving, data aggregation, and other subprocesses that are described in more detail below. With the data in the target format, a report may be generated, for example, to provide analytics for business intelligence with respect to a target audience.

More specifically, an ETL process may be configured to transform data in one or more staging database of the data warehouse, prior to one or more production database of the data warehouse, with a more targeted and less incremented data set being loaded into the data warehouse. The ETL process may primarily transform subscriber data to a target format on the staging database of the data warehouse, prior to being loaded into the production database of the data warehouse. Routines may be designed and developed to achieve a target format while substantially focusing data extraction on providing the target format. Aggregation of and relationships between the subscriber data and the target format may be coded into the routines on the staging database. In the staging database, the subscriber data may be extracted from a data source (e.g., vendor servers) and transformed using the routines. The routines in the staging database may be focused on the target format. Data quality and integrity checks as well as corrective actions such sorting and replacing bad data, as discussed below, may be performed as part of the routines in the staging database. The data in the target format may be loaded into production databases of the data warehouse. Thus, the ETL process transforms subscriber data into the target format in the staging databases of the data warehouse, prior to being loaded into the production databases of the data warehouse. The targeted nature of the ETL process results in the data warehouse primarily having targeted data. Process 200 is discussed in more detail below with respect to FIG. 2 and may take many different forms and include multiple and/or alternate components and facilities.

Alternatively, an ELT process may be configured to load a less targeted and more incremented data set onto the data warehouse with the data being transformed with routines in a staging database of the data warehouse. The ELT process may primarily transform subscriber data to the target format on the data warehouse. Subscriber data may be extracted from a data source (e.g., vendor servers) into the staging database. In the staging database, routines such as data quality and integrity checks as well as the corrective actions may be performed on the subscriber data. The subscriber data may be loaded into data warehouse 108 to provide a validated, cleaned, and offline copy of the subscriber data in data warehouse 108. In the data warehouse, the routines may be performed to re-shape the subscriber data into the target format. The extract and load processes may be performed on subscriber data and independently of the transformation process. In addition, the extract and load processes may include the data for the target format as well as additional subscriber data. Process 300 is discussed in more detail below with respect to FIG. 3 and may take many different forms and include multiple and/or alternate components and facilities.

Figure 2:
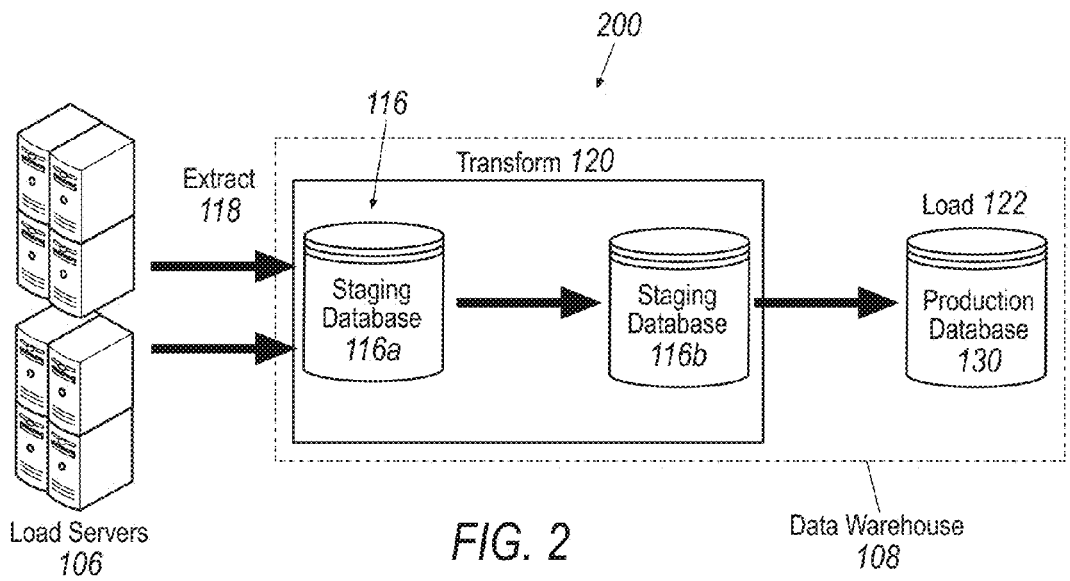
FIG. 2 illustrates an exemplary process for transforming subscriber data to a target format using an extract, load, and transform (ELT) process.

FIG. 2 illustrates an exemplary process 200 for ETL processing. Process 200 may include load servers 106, staging database 116a, staging database 116b, and production database 130. Exemplary data warehouse 108 may comprise any number of databases including staging database 116a, staging database 116b, and production database 130. Process 200 may include servers 106 connected to staging database 116a, staging database 116a connected to staging database 116b, and staging database 116b connected to production database 130. Process 200 may extract subscriber data from load servers 106 to staging database 116a. Process 200 may transform subscriber data into the target format for presentation using staging databases 116a and 116b, e.g., using routines including data quality and integrity checks as well as corrective actions such as generating alerts and replacing bad files, as discussed further below. Process 200 may load data in the target format to production database 130. While exemplary process 200 is shown in FIG. 2, the exemplary implementations illustrated in FIG. 2 are not intended to be limiting. Indeed, additional or alternative components or implementations may be used.

Figure 3:
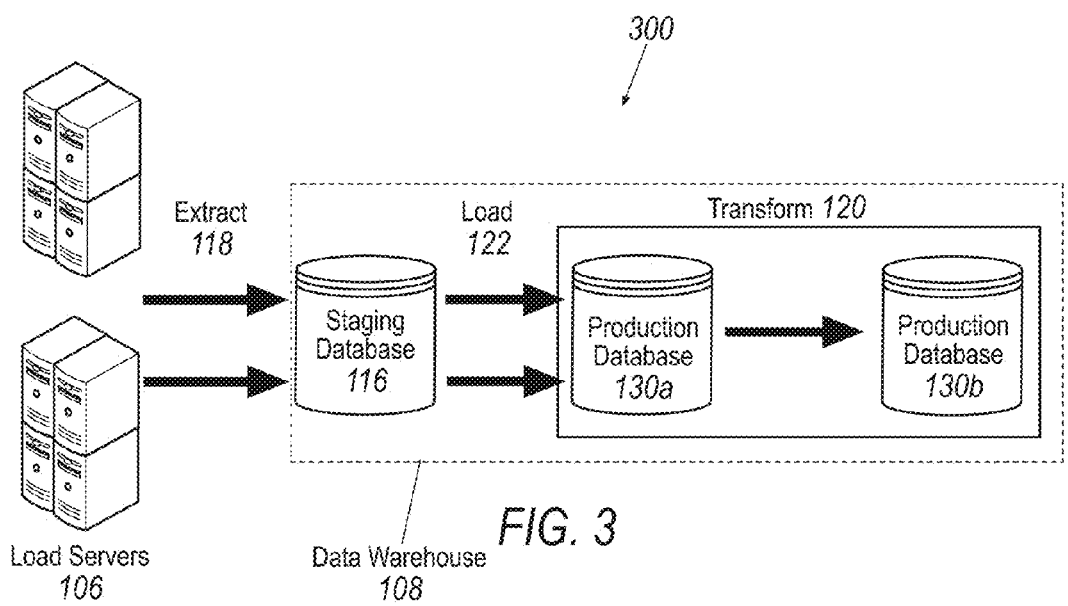
FIG. 3 illustrates an exemplary process for transforming subscriber data to a target format using an extract, transform, and load (ETL) process.

FIG. 3 illustrates an exemplary system 300 for ELT processing. Process 300 may include servers 106, staging database 116, production database 130a, and production database 130b. Exemplary data warehouse 108 may comprise any number of databases including staging database 116, production database 130a, and production database 130b. Process 300 may include load servers 106 connected to staging database 116, staging database 116 connected to production database 130a, and production database 130a connected to production database 130b. Process 300 may extract subscriber data from servers 106 to staging database 116. Process 300 may load subscriber data from staging database 116 to production database 130a. Subscriber data may be transformed into data having the target format from production database 130a to production database 130b, e.g., using routines including data quality and integrity checks as well as corrective actions such as generating alerts and replacing bad files, as discussed further below. While exemplary process 300 is shown in FIG. 3, the exemplary implementations illustrated in FIG. 3 are not intended to be limiting. Indeed, additional or alternative components or implementations may be used.

Figure 4:
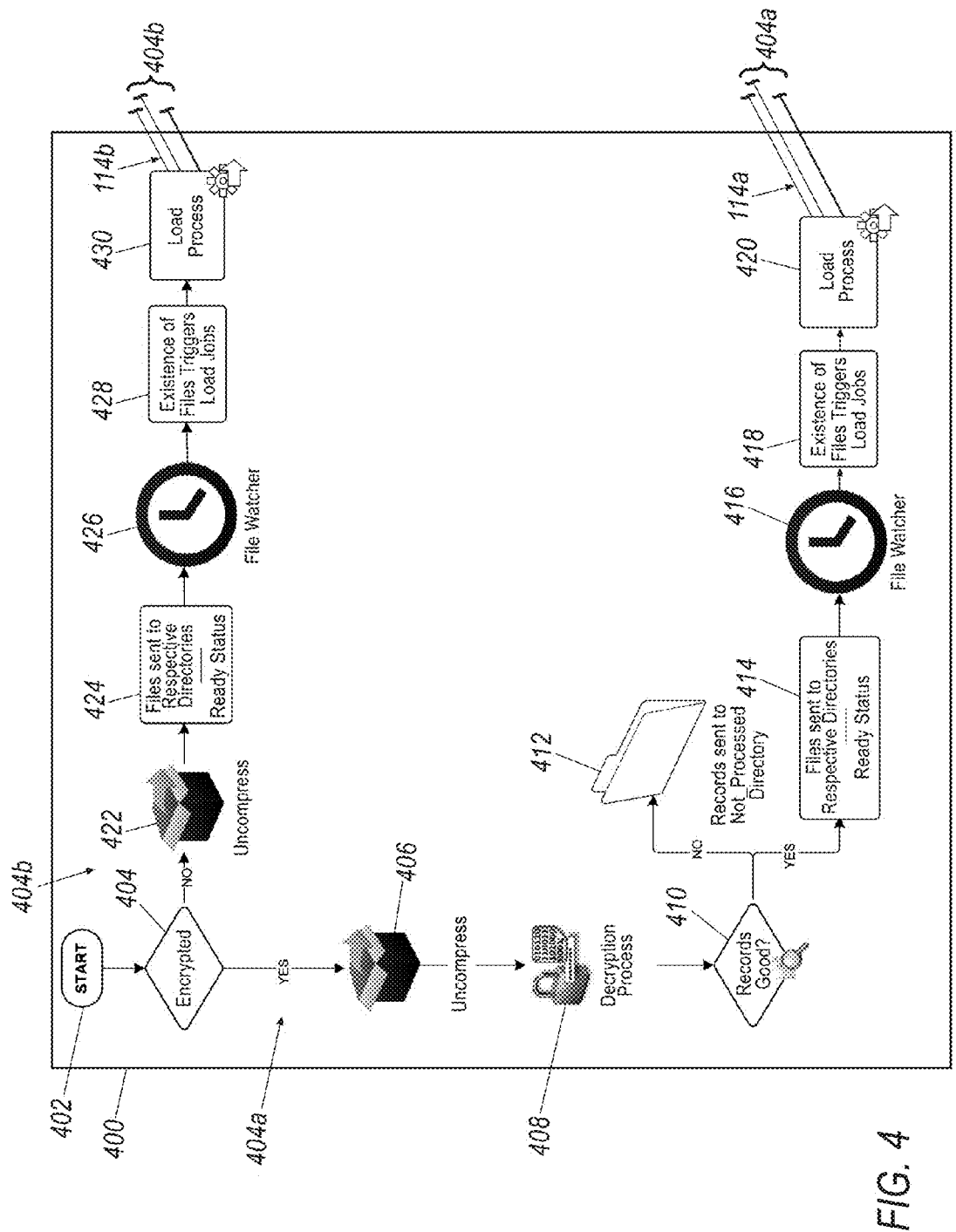
FIG. 4 illustrates an exemplary process for a load server having with a decryption route and a direct loading route on a load server.

FIG. 4 illustrates an exemplary process 400 for extracting and loading data, for example, on load server 106 with respect to an ELT process. While exemplary process 400 is shown in FIG. 4, the exemplary implementations illustrated in FIG. 4 are not intended to be limiting. Indeed, additional or alternative components or implementations may be used.

At oval 402, subscriber data including encrypted and unencrypted files may be received at load servers 106 in a compressed format from vendor servers 104.

At decision point 404, an encryption check module 404 may perform an encryption check. The encryption check module 404 may route encrypted files to decryption route 404a and unencrypted files to direct loading route 404b. Encryption check 404 may route the files, for example, based on a filename of the file, a file record of the file, a file size of the file, or another indicator of file format. For example, the filename may indicate whether a particular file includes encrypted data or unencrypted data such as summary or aggregated data.

For example, filenames may utilize a naming convention to indicate the content of each file. Exemplary naming convention may include vz_airsage_segment_trans 123567_201403210215.csv.gz, vz_airsage_poi_445899_201403210230.csv.gz, and vz_airsage_traffic_count_445690_201403210945.csv.gz.

With respect to the first filename, "trans" indicates that this file includes transaction information, which is typically encrypted to secure the underlying subscriber information. Referring to the second filename, "poi" indicates that the file contains information regarding a point of interest, which is typically unencrypted because the underlying information includes geographic attributes without sensitive subscriber information. With reference to the third exemplary filename, "count" indicates a summarization, which is typically unencrypted because the file includes a numerical value without sensitive subscriber information. The first, second, and third filenames may include numerical values indicating a record count associated with a number of records in the file, (e.g., 123567, 445899, 445690, respectively) and year, month, day, hour, and minute information associated with generation of the file (e.g., 201403210215, 201403210230, and 201403210945, respectively), for example, at the vendor server. Using the first filename to further emphasize this, the first filename indicates that the file includes 123567 records and was generated on Mar. 21, 2014 at 2:15 AM. The naming convention may also indicate a subscriber network name, a vendor name, a data format (e.g., "csv" for a comma separated value format), and a file type (e.g., "gz" for a compressed file type). Filenames and the associated naming conventions may be utilized to facilitate the routing and processing of files.

At illustration 406, encrypted files are received by decryption route 404a. The encrypted files may be decompressed, e.g., using a UNIX "gunzip" utility. The uncompressed files may be sent to a processing directory with a file watcher looking for encrypted files ready to be sent to a decryption algorithm.

At illustration 408, a decryption module 408 may receive the files at a decryption landing zone with the file watcher searching for decryption-ready files. An exemplary embodiment may include the file watcher having a scheduling tool (e.g., D-series, Ctrl-M, or IBM Maestro), which periodically looks for files at a predefined time interval (e.g., every minute). The file watcher is triggered at the predefined time interval to sweeps through associated file directories in search for the existence of decryption-ready files. The decryption module 408 may include a decryption algorithm (e.g. an RSA algorithm as described above) that may receive decryption-ready files from the file watcher. The decryption algorithm of the decryption module 408 may decrypt the files using the RSA keys associated with subscriber network 102. The algorithm may spawn multiple threads to process multiple sections of each file in parallel. If the decryption module 408 fails, e.g., due to a temporary server glitch or other reasons, after a portion of the file has been decrypted, the decryption module 408 may restart decryption to maintain integrity of the data. Upon failure of the decryption module 408 at a failure point, the partially decrypted files may be discarded or saved at load server 106 and the decryption algorithm may restart from a beginning point with respect to the file. With shorter data intervals, the decryption algorithm may be restarted with respect to smaller files thereby minimizing loss of system resources and time.

At decision point 410, a records check module 410 may determine if a file record of an individual file is good or bad, for example, based on entries in the fields of the file records. More specifically, the records check module 410 may confirm proper decryption based on the file record. For example, bad records may contain indicators of bad decryption, for example fields containing next line characters. Also, when bad records are decrypted, one record is split into multiple records which may be identified in a record count and associated alerts discussed below. If the record check module 410 indicates a bad file record, e.g., corruption during vendor processing at vendor servers 104 or that the file may not properly decrypted, the records check module may add a file extension of ".BAD" and move the file to a non-processed directory of staging database 116. If record check module 410 indicates a good file record, the records check module may add a file extension of ".READY" and move the file to a load ready directory of load server 106.

At illustration 412, files with a bad file record may be sent to the non-processed directory.

At block 414, load-ready files with good decrypted records may be received in the load-ready directory and further sorted into directories by file type. The load-ready files may be renamed with an extension of ".ready" to indicate completion of the file to a file watcher.

At illustration 416, a file watcher module may look for load-ready files, for example, using a scheduling tool, which periodically looks for files at a predefined time interval (e.g., every minute). The file watcher is triggered at the predefined time interval to sweep through associated file directories in search for the existence of load ready files. The file watcher module may send the load-ready files, e.g., having the ".ready" extension, to a load process module.

At block 418, existence of load-ready files may trigger the file watcher module to assign a load job to each file. If there are multiple files ready to be loaded, the file watcher may initiate multiple load processes to kick off process multiple load jobs in parallel. Upon detection of the presence of a file by the file watcher, the file watcher triggers a load process thereby spawning multiple threads to load each file. Similarly, the presence of other load ready files triggers additional load processes.

At block 420, a load process module 420 receives and loads the load-ready files to data warehouse 108. If multiple files ready to be loaded, the file watcher module 416 may initiate multiple load processes in parallel and each load process may spawn multiple threads to process each portion of the file. The load process module 420 may run continuously without waiting for completion of other load processes.

At illustration 422, direct loading route 404b may receive the unencrypted files. The files may be uncompressed, e.g., using the UNIX "gunzip" utility in a manner similar to block 406.

At block 424, the compressed files may be received by and sorted by file type in a processing directory in a manner similar to block 414.

At illustration 426, a file watcher module 426 may look for load-ready files in a manner similar to block 418. The file watcher module 426 may pick-up the load-ready files, which may include a ".ready" extension.

At block 428, existence of load-ready files may trigger the file watcher module to assign a load job to each file. If there are multiple files ready to be loaded, the file watcher may initiate multiple load processes to kick off process multiple load jobs in parallel.

At block 430, a load process module 430 receives and loads the load-ready files to data warehouse 108. If multiple files are ready to be loaded, the file watcher module 426 may initiate multiple load processes in parallel and each load process may spawn multiple threads to process each portion of the file. The load process module 430 may run continuously without waiting for completion of other load processes.

Exemplary process 500 may be configured to transform data received from process 400, for example, with respect to data warehouse 108 using an ELT process. Process 500 may include an exemplary process 500a that may receive files from decryption route 114a and an exemplary process 500b that may receive files from direct loading route 114b. Alternatively, process 500 may be configured as an ETL process. In addition, the components and implementations of processes 500a and 500b are intended to be interchangeable.

Figure 5A:
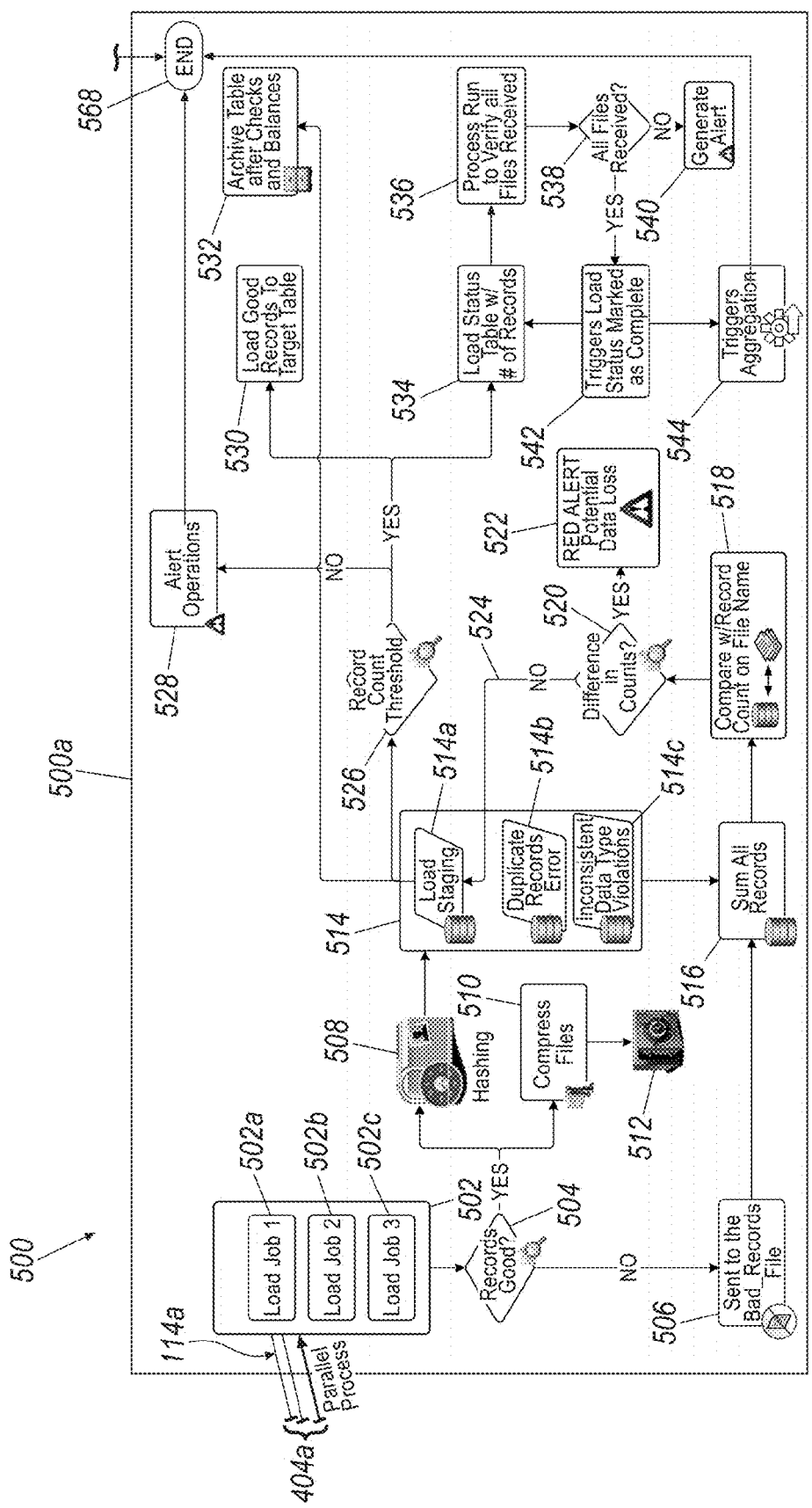
FIG. 5a illustrates an exemplary process for transforming data from the decryption route on a data warehouse.

FIG. 5a illustrates exemplary process 500a, for example, to transform data from decryption route 404a with respect to data warehouse 108. Process 500a may receive files from decryption route 404a, for example, including recently unencrypted files that were received from vendor servers 104 in encrypted format. While exemplary process 500a is shown in FIG. 5a, the exemplary implementations illustrated in FIG. 5a are not intended to be limiting. Indeed, additional or alternative components or implementations may be used.

At block 502, a job tasking module 502 may receive the originally encrypted files from decryption route 404a and assign a dedicated load job to each file. Any number of load jobs may be designated to any number of files. For example, load jobs 502a, 502b, and 502c may be generated, each corresponding to a particular file. Each load job may be processed in parallel with other file load jobs. For example, load jobs 502a, 502b, and 502b may each process respective file load jobs in parallel. Each load job may spawn multiple threads to each process a portion of the particular file.

At block 504, a records check module 504 may determine if a file record on a file is good or bad. If the number of fields in the file record matches with a desired file layout, e.g., specified to the vendor servers 104, the record check module 504 may determine that the file is good and may send the file to a hashing module 508.

At block 506, if the number of fields in the file record does not match with the desired file layout, the record check module 504 may determine that the file is bad and write the file to bad records directory that may be sorted by file type and from which vendor server 104 the file was received. As discussed further below, if the files in the bad records directory exceed a record count threshold of a threshold module 526, an alerts module 528 may generate alerts to a production team and the vendor.

At illustration 508, a hashing module 508 may be performed on files from decryption route 404a, because these files may contain subscriber keys having subscriber identifiers. To maintain data security on data warehouse 108, hashing module 508 converts subscriber keys into alpha numeric characters to hide subscriber identifiers before the files are loaded to data warehouse 108. Hashing module 508 is discussed in more detail as process 700 with respect to FIG. 6.

At block 510, with the decrypted and hashed file being loaded into data warehouse 108, the underlying file from decryption route 404a may be compressed. Underlying files may be compressed to increase file transfer speeds and preserve file storage until these files are purged.

At illustration 512, the compressed file may be sent to a backup directory. Each backup file may reside in the backup directory for a specified period of time, e.g., approximately a day, and may be purged during a regular, e.g., daily, cleaning of the backup directory.

At block 514, a staging module 514 may receive the hashed files for staging. Fields from each hashed file may be loaded into corresponding columns and rows of staging table 514a, unique violations (UV) error table 514b, and constraint violations (CV) error table 514c. Staging table 514a may include fields loaded from each record. Unique violations error table 514b may include data errors related to database index violations (e.g., unique primary index violations), which typically occur during application of the loading process. Constraint violations error table 514c may include data errors related to data type violations, which typically occur during initiation of the loading process. Data type violations may include incorrect character types (e.g., a letter in a number field), incorrect dates (e.g. future dates or incorrectly formatted dates), broken records (e.g., a good record that is split into multiple lines due to an existence of special characters or line feeds), and unnecessary characters (e.g., unnecessary decimal points). Good records may be loaded into staging table 514a for subsequent loading into a main target production table. Each file may have any or all of the above tables corresponding to fields loaded from the file.

Bad records such as duplicates may include fields that may be loaded into a unique violations error table 514b from staging table 514a. When a record is loaded to staging table 514a, a unique index value (e.g., unique primary index value) may be stored as part of the record. The unique index value may be stored in a portion of the record that indicates a physical location of the record with respect to a database, for example, a ROWID portion of the record. When another record with a similar index value is loaded into the staging table 514a, the index value is incremented, which triggers the load process to mark the record as a duplicate and move the record to unique violations error table 514b.

At block 516, a records sum module 516 may perform data validation with respect to the originally encrypted files. A records sum module 516 may sum the record counts on staging table 514a, duplicate records error table, constraint violations error table, and files in the bad records directory and not-processed directory.

At block 518, a records compare module 518 may compare a record count from the records sum module with a record count on a corresponding input file received from vendor servers 104.

At decision point 520, a difference in record counts may be determined. If the record counts match, this may be an indication that the data in the particular file may be substantially free of issues. If the records counts do not match, this may be an indication of a major issue that may result in data corruption or loss.

At block 522, an alerts module 522 may red-flag files with record counts that do not match and may send an alert to a production support team or the vendor. The alert may be generated according to and indicating a type of failure, whether the data is encrypted or unencrypted, the filename, and which load server from which it was received. Data corruption may be due to an encryption process failure that may result in corrupted encryption strings. Processing may be halted to avoid incorrect data being loaded and provided in a report, for example, to provide data analytics for business intelligence. Real-time or near real-time processing may detect abnormalities within minutes and escalate the issue to the vendor to minimize lost data and time. The process may halt until the issue may be resolved with new corrected data from vendor servers 104.

At route 524, records with matching file counts may be loaded to staging table 514a.

At decision point 526, a threshold module 526 may compare the number of records loaded onto staging table 514a with the number of records on the input file from vendor servers 104. The threshold module may compare record counts relative to a threshold, e.g., approximately 2%. The threshold may be set to any percentage suitable for a desired level of data integrity set by a particular business or industry. If the percentage difference in records counts may be at or less than the threshold, the threshold module may send the data to a load status table. If the percentage difference in records counts may be greater than the threshold (e.g., due to records not-loaded due to various errors described above), the threshold module may send an alert to the product support team or the vendor. The threshold module 526 may only stop the particular file in question and may not halt the overall process as may be desirable for encryption issues. Other load jobs may continue processing other files.

At block 528, if the failed record count is greater than the threshold, the processing of that particular file may halt while the product support team or vendor may be alerted. The vendor may send corrected data so processing of the particular file may resume. The other load jobs may continue while this particular process is down.

At block 530, if the failed record count is less than the threshold, the threshold module may allow the records to be loaded from staging table 514a to a target table of a target table module. To preserve data integrity, loading from each staging table for each file may be performed sequentially to avoid two processes writing or updating into the same table at the same time.

At block 532, with staging table 514a loaded to the target table, an archiving module 532 may rename staging table 514a to indicate that the table may be ready for archiving after having passed checks such as the exemplary ones above.

At block 534, a load status module 534 may record an entry in a load status table to track the files that are received and loaded for a particular file type, for example, to indicate that the particular file for the particular type has been loaded successfully. In addition, another entry may be recorded in an audit table with the file name that was loaded, how long it took to load the file, how many record were loaded on the file, and on which loading server 106 the file was loaded. The load status module 534 may be used to determine if all the files for a particular day for a particular file type has been loaded. This determination from the load status module 534 may be used to determine if aggregate jobs may kick-off to aggregate and summarize the data for a report, for example, to provide data analytics for business intelligence.

At block 536, a verification module 536 may run, e.g., periodically or continuously, to track if all the files that are received and loaded for a particular file type. For example, if files are received in 10 minute intervals for each file type, data warehouse 108 may receive approximately 144 files on a daily basis, based on 6 intervals per hour for a 24 hour period. The verification module may run after a specified inactivity period (e.g., approximately 30 or 60 minutes) to determine if all the files are received for a particular file type for that particular day. The inactivity period may be set to any amount of time suitable for a desired level of data integrity set by a particular business or industry.

At block 538, if any of the files are missing, a receipt check module 538 may identify the particular files that are missing and the date, hour, and minute for each file, for example, as designated by the filename. The record check module 538 may be triggered by a counter which tracks of the files that are received and what files are expected to be received for each file type. The record check module 538 may check the production database for received files. When a file is received by the production database, the file is accounted for by the counter while record check module 538 checks the production database in predefined intervals to determine which files are received and expected. The receipt check module 538 may continuously or periodically (e.g., every 30 or 60 minutes) check for updates. The receipt check module 538 may perform this check at any frequency suitable for a desired level of data integrity set by a particular business or industry.

At block 540, an alerts module 540 may receive the missing file details from the receipt check module and generate an alert. The alerts module 540 may generate an alert with identification of missing files and at periodic increments thereafter (e.g., every 30 or 60 minutes). The periodic increments may be set to any frequency suitable for a desired level of data integrity set by a particular business or industry. Alerts may be sent to the production support team and the vendor. When the missing files are received from vendor server 104, the recovered files may be sent to process 400.

At block 542, when receipt check module 538 indicates that the missing files are loaded, a load complete module 542 updates a load status on the load status table. The load status may indicate that receipt and loading of all the files for a particular day may be complete.

At block 544, an aggregation module 544 may receive the load complete status and trigger aggregation of data for analytics and business intelligence reports.

At block 568, process 500 may end.

Figure 5B:
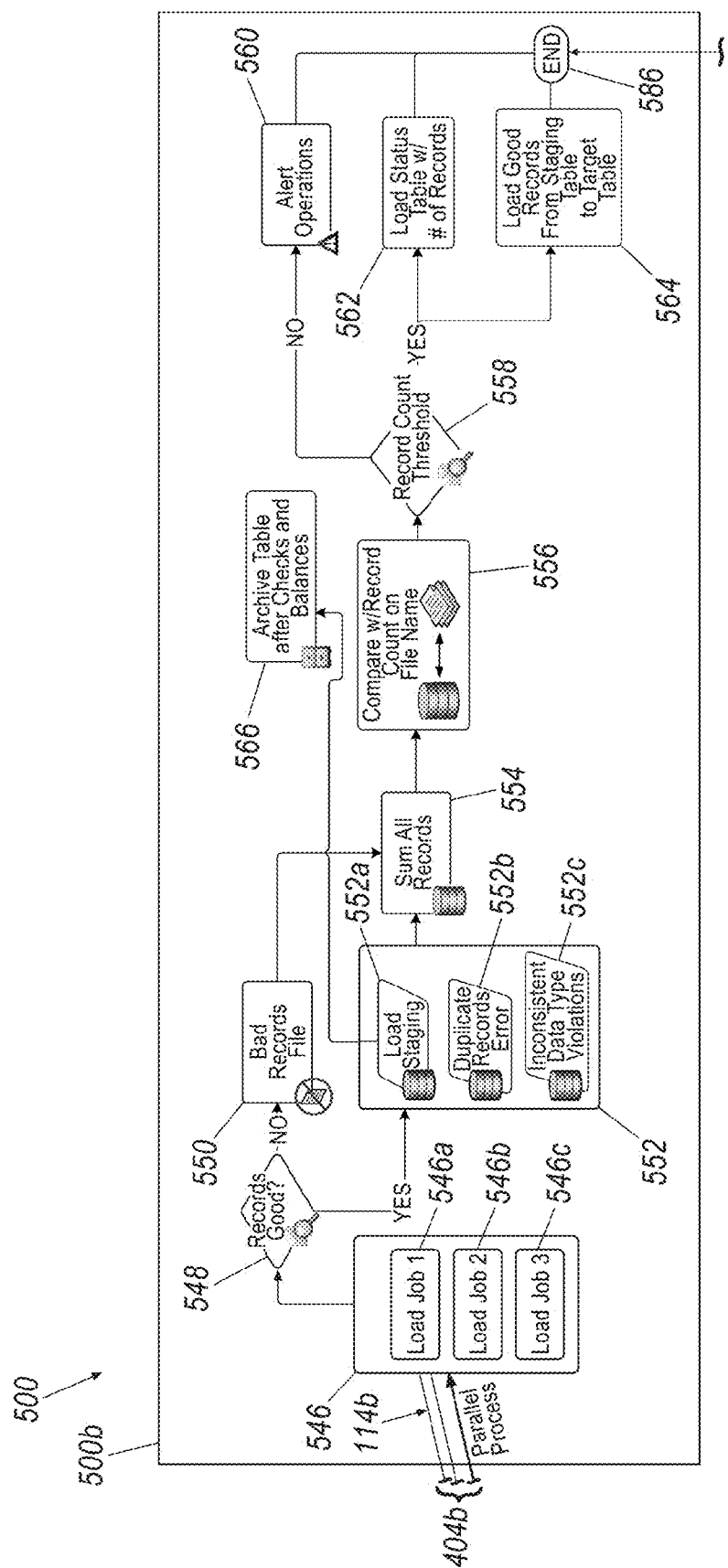
FIG. 5b illustrates an exemplary process for transforming data from the direct loading route on the data warehouse.

FIG. 5b illustrates exemplary process 500b, for example, to transform data from direct loading route 114b with respect to data warehouse 108. Process 500b may receive files from direct loading route 114b, for example, including files that were received from vendor servers 104 in unencrypted format. While exemplary process 500b is shown in FIG. 5b, the exemplary implementations illustrated in FIG. 5b are not intended to be limiting. Indeed, additional or alternative components or implementations may be used.

At block 546, a job tasking module 546 may receive originally unencrypted files from direct loading route 404b and assign a dedicated load job to each file. Any number of load jobs may be designated to any number of files. For example, load jobs 502a, 502b, and 502c may be generated, each corresponding to a particular file. Each load job may be processed in parallel with other file load jobs. For example, load jobs 502a, 502b, and 502b may each process respective file load jobs in parallel. Each load job may spawn multiple threads to each process a portion of the particular file.

At block 548, a records check module 548 may determine if a file record on a file is good or bad. If the number of fields in the file record matches with a desired file layout, e.g., specified to the vendor servers 104, the record check may determine that the file is good and may send the file to a staging module.

At block 550, if the number of fields in the file record does not match with the desired file layout, the records check module 548 may determine that the file is bad and write the file to bad records directory that may be sorted by file type and from which vendor server 104 the file was received.

At block 552, a staging module 552 may receive files for staging. Fields from each file may be loaded into corresponding columns and rows of staging table 552a, unique violations (UV) table 552b, and constrain violations (CV) error table 552c. Good records may include fields that may be loaded into staging table 552a for subsequent loading into a main target production table. Bad records such as duplicates may include fields that may be loaded into a UV table 552b. Bad records such as data type or constraint violations, e.g., incorrect dates including future dates and improper date formats including unnecessary decimal points, may include fields that may be loaded into CV error table 552c. Each file may have any or all of the above tables corresponding to fields loaded from the file.

At block 554, a records sum module 554 may perform data validation with respect to the originally unencrypted files from direct loading module 404b. The records sum module 554 may sum the record counts on staging table 5552a, duplicate records error table, constraint violations error table, and files in the bad records directory.

At block 556, a record compare module 556 may compare a record count from the records sum module with a record count on a corresponding input file received from vendor servers 104. If the record counts match, this may be an indication that the data in the particular file may be substantially free of issues. If the records counts do not match, this may be an indication of a major issue that may result in data corruption or loss. Files with non-matching record counts may be red-flagged and an alert may be sent the production support team or the vendor. The process may halt until the issue may be resolved with new corrected data from vendor servers 104. Records with matching file counts may be loaded to staging table 552*a*.

At decision point 558, a threshold module 558 may compare the number of records loaded onto staging table 552A with the number of records on the input file from vendor servers 104. The threshold module 558 may compare record counts relative to a threshold, e.g., approximately 2%. If the percentage difference in records counts may be at or less than the threshold, the threshold module may send the data to a load status table. If the percentage difference in records counts may be greater than the threshold (e.g., due to records not-loaded due to various errors described above), the threshold module may send an alert to the product support team or the vendor. Threshold module 558 may only stop the particular file in question and may not halt the overall process as may be desirable for encryption issues. Other load jobs may continue processing other files.

At block 560, if the failed record count may be greater than the threshold, an alerts module 560 may halt processing of a particular file while the product support team or vendor may be alerted. The vendor may send corrected data so processing of the particular file may resume. The other load jobs may continue while this particular process may be down.

At block 562, a load status module 562 may record an entry in a load status table to track the files that are received and loaded for a particular file type, for example, to indicate that the particular file for the particular type has been loaded successfully. In addition, another entry may be recorded in an audit table with the file name that was loaded, how long it took to load the file, how many record were loaded on the file, and on which load server 106 the file was loaded. The load status module 562 may be used to determine if all the files for a particular day for a particular file type has been loaded. This determination from the load status module 562 may be used to determine if aggregate jobs may kick-off to aggregate and summarize the data for a report, for example, to provide data analytics for business intelligence.

At block 564, if the failed record count is less than the threshold, the threshold module may allow the records to be loaded from staging table 552*a* to target table 564. To preserve data integrity, loading from each staging table for each file may be performed sequentially to avoid two processes writing or updating into the same table at the same time.

At block 566, with staging table 552*a* loaded to the target table, an archiving module may rename staging table 552*a* to indicate that the table may be ready for archiving after having passed the above checks.

At block 568, process 500 may end.

Figure 6:
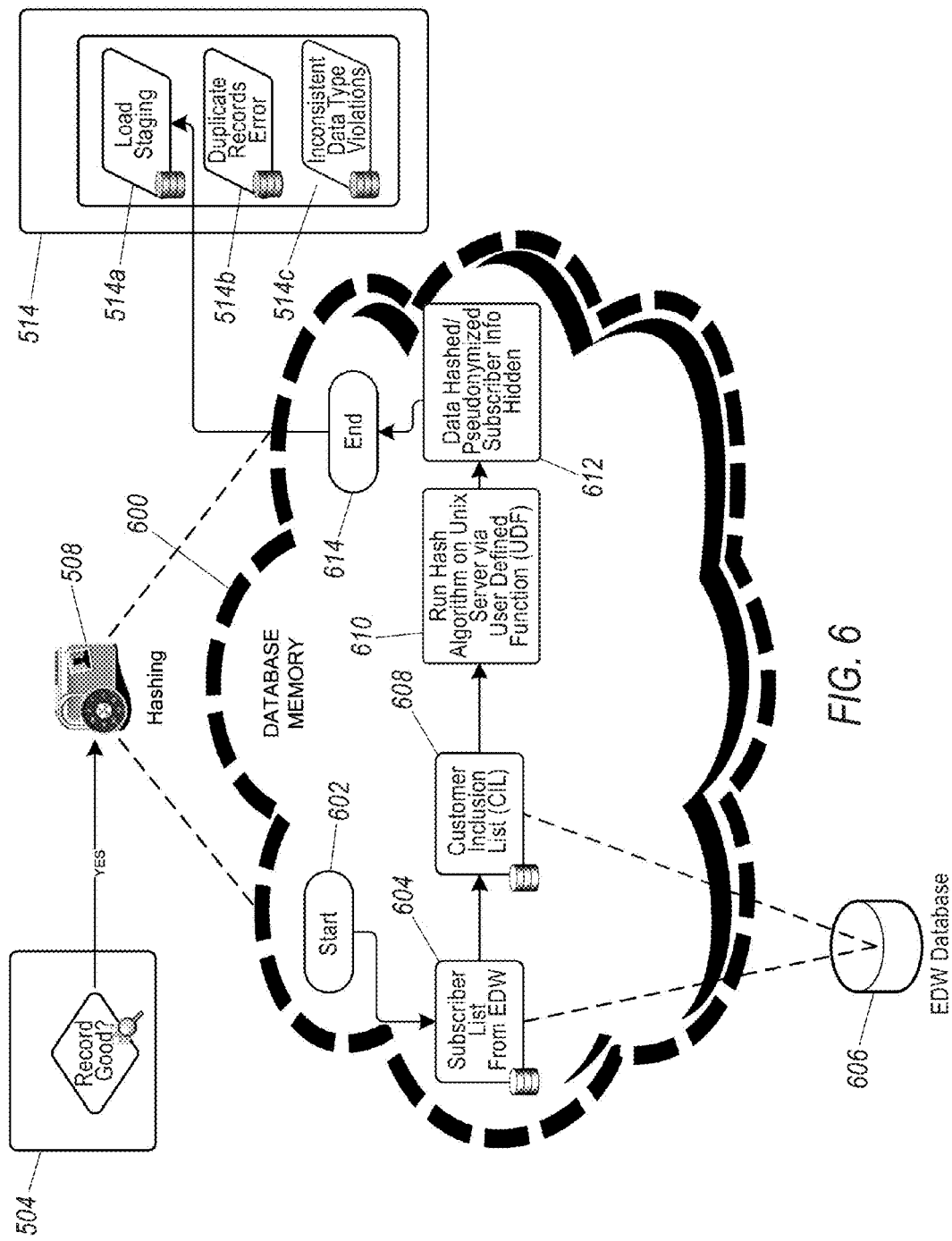
FIG. 6 illustrates an exemplary process for hashing data from the decryption route.

FIG. 6 illustrates an exemplary process 600 of hashing (mentioned above with respect to illustration 508). Process 600 may include oval 602, block 604, illustration 606, block 608, block 610, block 612, and oval 614. While exemplary process 600 may be shown in FIG. 6, the exemplary implementations illustrated in FIG. 6 are not intended to be limiting. Indeed, additional or alternative components or implementations may be used.

At block 602, the hashing module 508 may receive good files from the records check module 504.

At block 604, a subscriber list module 604 may check, e.g., daily, a subscriber list associated with a particular file against a list of subscribers from enterprise data warehouse.

At illustration 606, the list of subscribers may be maintained an enterprise data warehouse, for example production database 130 (discussed further below).

At block 608, a customer inclusion module 608 may compare subscriber identifiers in a field record of a particular file with the list of subscribers. The customer inclusion module 608 may filter out non-subscriber data information such that only subscriber information may be sent to a customer inclusion list. The customer inclusion list may include eligible subscribers that have not opted-out and may exclude subscribers that have opted-out. Resulting subscriber data associated with the customer inclusion list may be passed through a hashing algorithm on load server 106, e.g., a UNIX server. The customer inclusion list may be isolated from user access to preserve the security of the subscriber keys.

At block 610, the hashing algorithm may anonymize the data such that the subscriber identity may be hidden and may be substantially free from subscriber identity data. The hashing module may apply the hashing algorithm to convert subscriber keys to alpha numeric characters such that the subscriber identity may be pseudononymized or hashed to hide identify information while preserving data integrity. The data resulting from the hashing algorithm may have anonymized subscriber keys. The anonymized data may be loaded into a database of data warehouse 108. The anonymized data may contain good records as well as bad records to be processed during the staging module 514 (described above).

At block 612, the hashing module 508 may hide the subscriber identity so that it is not visible. This may provide a substantially secure process to limit access to servers and databases with the transaction data. However, to further secure the process, the pseudonymization of the subscriber keys may take place in a volatile table or memory that may be purged. Thus, the hashing module 508 may segregate and purge subscriber identity data and provide anonymized files to data warehouse 108.

At block 614, process 600 may end and pass the resulting data to the staging module 514.

Figure 7:
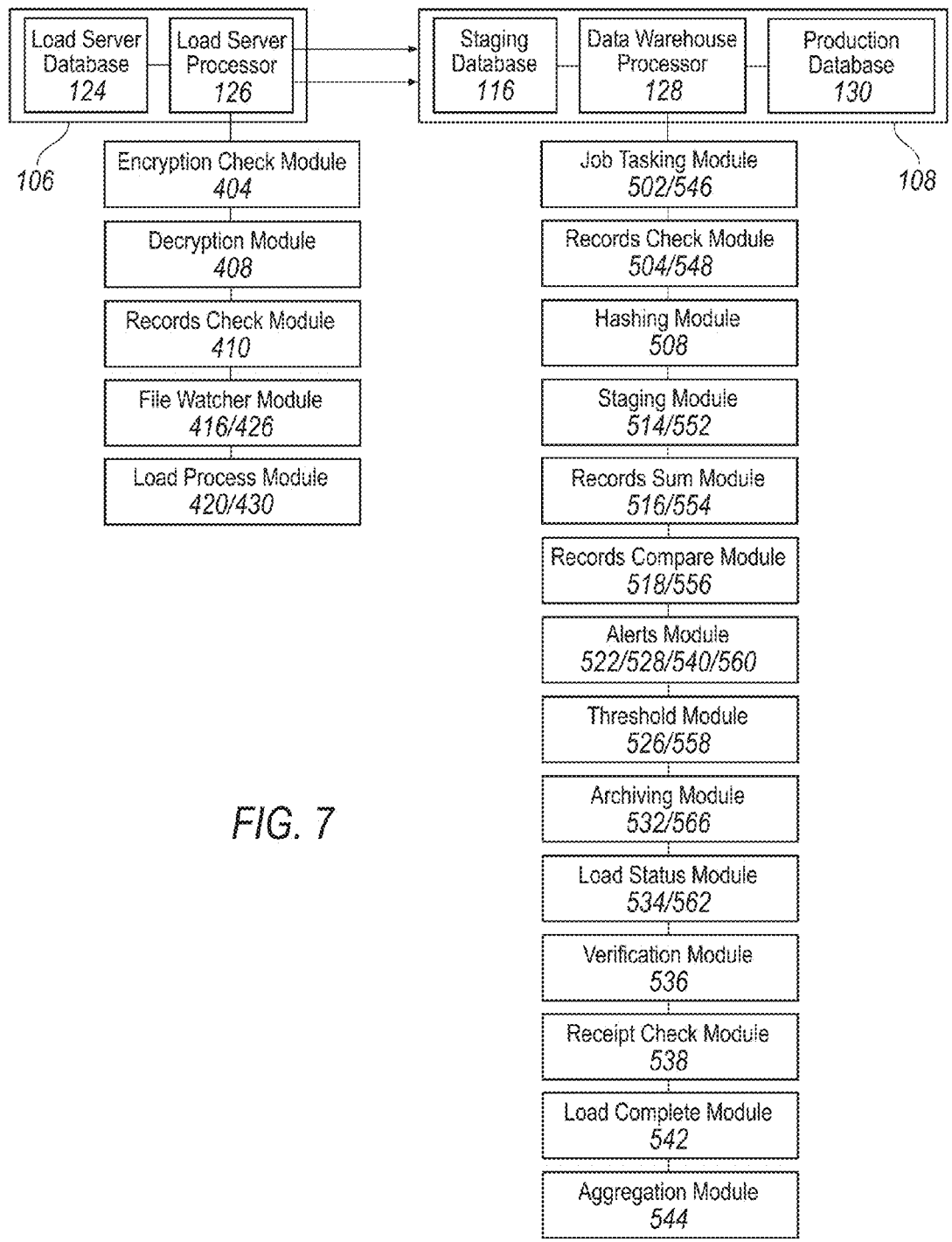
FIG. 7 illustrates an exemplary system configuration, for example, including an exemplary architecture and related operations.

FIG. 7 illustrates an exemplary configuration of system 100, for example, including an exemplary architecture and related operations. Load server 106 may include load server database 124 operatively connected to load server processor 126. Data warehouse 108 may include staging database 116 operatively connected to data warehouse processor 128 that is further operatively connected to production database 130. While exemplary system may be shown in FIG. 7, the exemplary implementations illustrated in FIG. 7 are not intended to be limiting. Indeed, additional or alternative components or implementations may be used.

Load server 106 may store data on load server database 124 while load server processor 126 performs operations as discussed above. For example, load server processor 126 may perform the encryption check module 404, decryption module 408, records check module 410, file watcher modules 416 and 426, and load process modules 420 and 430.

Data warehouse 108 may store data on staging database 116 and production database 130 while data warehouse processor 128 performs operations on data as discussed above. For example, data warehouse 108 may store data on staging database 116 while data warehouse processor 128 performs job tasking modules 502 and 546 and records check modules 504 and 548. Further, data warehouse 108 may store data in volatile memory while data warehouse processor 128 performs hashing module 508, for example, to allow segregation of subscriber identifiers from production database 130 and purging of subscriber identifiers after successful loading to production database 130. In addition, data warehouse 108 may store data on production database 130 while data warehouse processor 128 performs staging modules 514 and 552, records sum modules 516 and 554, records compare modules 518 and 558, alerts modules 522, 528, 540, and 560, threshold modules 526 and 558, archiving modules 532 and 566, load status modules 534 and 562, verification module 536, receipt check module 538, load complete module 542, and aggregation module 544.

Thus, system 100 may be configured to extract 118, load 122, and transform 120 subscriber data 110 into a target format for reporting. The system may comprise load server 106 configured to receive subscriber data 112 including encrypted and unencrypted data from vendor server 104 connected to subscriber network 102 and sort the encrypted files to decryption route 404a and the unencrypted files to direct loading route 404b. Decryption route 404a may be configured to decrypt the encrypted files. Data warehouse 108 may include a first staging module configured load files from decryption route 404a and a second staging module configured to load files from direct loading module 104a. In operation, exemplary processes may comprise acts of receiving subscriber data 112 on load servers 106 from vendor servers 104, the subscriber data 112 including encrypted and unencrypted files originating from subscriber data 110 from subscriber network 102, decrypting the encrypted files from subscriber data 112 with decryption route 404a, receiving subscriber data 114 from the decryption module at a tasking module of data warehouse 108, the tasking module being configured to assign a dedicated load job to each file, hashing files from the tasking module to remove subscriber identity data, loading records of each file from the tasking module to a staging module having a staging table for each file, passing the records from the staging module through a threshold module to a target table, and generating a report from the target table.

In general, computing systems and/or devices such as any portion of system 100, e.g., vendor servers 104, load servers 106, and data warehouse 108, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as system 100 generally include computer-executable instructions such as the instructions of any portion of system 100, e.g., vendor servers 104, load servers 106, data warehouse 108, staging database 116, and production database 130, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein such as any portion of system 100, e.g., staging database 116, production database 130, and data warehouse 108, may include various kinds of mechanisms for storing, accessing, and retrieving various kinds of data, including a hierarchical database, a set of files in a file system, an application database in a proprietary format, a relational database management system (RDBMS), etc. Each such data store may be generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    at least one load server having a load server processor configured to receive subscriber files including encrypted and unencrypted data, the load server processor being configured to sort the encrypted files to a decryption route and the unencrypted files to a direct loading route, the decryption route having a decryption module configured to decrypt the encrypted files; and
    a data warehouse having at least one data warehouse processor configured to load files from the decryption route and direct loading route, the at least one data warehouse processor being configured to dedicate a load job to each file and a plurality of threads from each load job to respective file portions of each file, thereby processing the respective file portions from the direct loading and decryption routes in parallel,
    wherein the data warehouse further comprises a staging module configured to load fields from each file into corresponding portions of at least three tables including a staging table for fields of files from the decryption route and direct loading route, an error table for index violations, and a constraint violations table for data type violations.

2. The system of claim 1, wherein the data warehouse processor includes a first staging module that assigns a first load job set to files from the decryption route and a second staging module that assigns a second load job set to files from the direct loading route.

3. The system of claim 1, wherein the decryption route further includes a decompression module.

4. The system of claim 1, wherein the direct loading route further includes a decompression module.

5. The system of claim 1, wherein the data warehouse processor further comprises a hashing module configured to remove subscriber identity data to anonymize files before the files are loaded to the data warehouse.

6. The system of claim 5, wherein the subscriber identity data is purged after the files are anonymized.

7. The system of claim 1, further comprising a load status table configured to load fields from the staging table.

8. A method comprising:
    receiving, with at least one load server having a load server processor, subscriber files including encrypted and unencrypted data;
    sorting, with the load server processor, the encrypted files to a decryption route and the unencrypted files to a direct loading route, the decryption route having a decryption module configured to decrypt the encrypted files;
    loading files, to a data warehouse having at least one data warehouse processor, from the decryption route and direct loading route; and
    dedicating, with the at least one data warehouse processor, a load job to each file and a plurality of threads from each load job to respective file portions of each file, thereby processing the respective file portions from the direct loading and decryption routes in parallel,
    wherein the data warehouse further comprises a staging module configured to load fields from each file into corresponding portions of at least three tables including a staging table for fields of files from the decryption route and direct loading route, an error table for index violations, and a constraint violations table for data type violations.

9. The method of claim 8, further comprising:
    decrypting, with the load server processor, the encrypted files on the decryption route;
    hashing files, with the data warehouse processor, from the decryption route to remove subscriber identity data;
    loading fields from each file to a table for each file on the data warehouse; and
    generating a report from the table.

10. The method of claim 9, further comprising sorting files between a good records directory and a bad records directory.

11. The method of claim 9, further comprising compressing and purging the subscriber identity data removed from hashing.

12. The method of claim 10, further comprising generating a records count by summing records from the table and from the bad records directory.

13. The method of claim 12, further comprising comparing a record count on a filename of a particular file with the generated record count.

14. The method of claim 13, further comprising generating an alert if the record counts do not match.

15. A non-transitory computer readable medium storing program that when executed by a processor causes the processor to perform operations, comprising:
    receiving subscriber files including encrypted and unencrypted data;
    sorting the encrypted files to a decryption route and the unencrypted files to a direct loading route, the decryption route having a decryption module configured to decrypt the encrypted files;
    loading files to a data warehouse from the decryption route and direct loading route; and
    dedicating a load job to each file and a plurality of threads from each load job to respective file portions of each file, thereby processing the respective file portions from the direct loading and decryption routes in parallel, wherein the data warehouse further comprises a staging module configured to load fields from each file into corresponding portions of at least three tables including a staging table for fields of files from the decryption route and direct loading route, an error table for index violations, and a constraint violations table for data type violations.

16. The medium of claim 15, further comprising:
loading fields from each file into a target table;
aggregating data from the target table; and
generating a report from the target table.

17. The medium of claim 16, further sorting the subscriber data between a good records directory and a bad records directory.

18. The medium of claim 16, further comprising compressing and purging the subscriber identity data from hashing.

19. The medium of claim 17, further comprising loading fields from each file into a staging table and generating a records count by summing records from the staging table and the bad records directory.

* * * * *